United States Patent
Sato et al.

(10) Patent No.: US 10,137,835 B2
(45) Date of Patent: Nov. 27, 2018

(54) REAR IMAGING DEVICE (71) Applicant: MURAKAMI CORPORATION, Shizuoka (JP)

(72) Inventors: Hidenori Sato, Shizuoka (JP); Kenji Ichikawa, Shizuoka (JP)

(73) Assignee: MURAKAMI CORPORATION, Shizuoka (JP)

( * ) Notice: Subject to any disclaimer, the term of this patent is extended or adjusted under 35 U.S.C. 154(b) by 151 days.

(21) Appl. No.: 15/123,054

(22) PCT Filed: Mar. 3, 2015

(86) PCT No.: PCT/JP2015/056172
§ 371 (c)(1),
(2) Date: Oct. 7, 2016

(87) PCT Pub. No.: WO2015/133457
PCT Pub. Date: Sep. 11, 2015

(65) Prior Publication Data
US 2017/0028918 A1  Feb. 2, 2017

(30) Foreign Application Priority Data
Mar. 4, 2014  (JP) .................. 2014-041504

(51) Int. Cl.
*H04N 5/225* (2006.01)
*B60R 1/00* (2006.01)
(Continued)

(52) U.S. Cl.
CPC .............. *B60R 1/00* (2013.01); *B60R 1/0602* (2013.01); *H04N 5/2252* (2013.01);
(Continued)

(58) Field of Classification Search
CPC ......... B60R 1/006; B60R 1/06; B60R 1/0602; H04N 5/2252; H04N 5/2254; H04N 7/183
See application file for complete search history.

(56) References Cited

U.S. PATENT DOCUMENTS

| | | | |
|---|---|---|---|
| 2006/0157985 A1* | 7/2006 | Dahowski | E03F 3/046 285/405 |
| 2006/0273224 A1* | 12/2006 | Hoffjann | B64C 1/1453 244/136 |
| 2008/0112050 A1* | 5/2008 | Nomura | G02B 1/105 359/507 |

FOREIGN PATENT DOCUMENTS

| | | |
|---|---|---|
| JP | 61-58141 | 4/1986 |
| JP | 4-138943 | 5/1992 |

(Continued)

OTHER PUBLICATIONS

International Search Report issued in International Application No. PCT/JP2015/056172, dated Apr. 21, 2015, along with English-language translation thereof.

*Primary Examiner* — Obafemi O Sosanya
(74) *Attorney, Agent, or Firm* — Greenblum & Bernstein, P.L.C.

(57) ABSTRACT

A rear imaging device is provided. The rear imaging device is attached to a mobile object such as a vehicle, and is provided with an imaging device for imaging an area rearward of the mobile object, and a housing for housing the imaging device. At a rear end portion of the housing, drainer pieces are formed extending rearward. A plurality of the drainer pieces are formed in a circumferential direction of the housing. Tip end portions of the drainer pieces are formed narrower toward tip points thereof, with base portions of the adjacent drainer pieces being adjacent to each other.

8 Claims, 5 Drawing Sheets

(51) Int. Cl.
*B60R 1/06* (2006.01)
*H04N 7/18* (2006.01)
*B60R 1/12* (2006.01)

(52) U.S. Cl.
CPC ........... *H04N 5/2254* (2013.01); *H04N 7/183* (2013.01); *B60R 2001/1253* (2013.01); *B60R 2300/8046* (2013.01); *B60R 2300/8066* (2013.01)

(56) References Cited

FOREIGN PATENT DOCUMENTS

| JP | 2007-316167 | 12/2007 |
| JP | 2008-148276 | 6/2008 |
| JP | 2009-241749 | 10/2009 |

\* cited by examiner

REAR IMAGING DEVICE

TECHNICAL FIELD

The present invention relates to a rear imaging device for imaging an area rearward of the mobile object.

BACKGROUND ART

Conventionally, a mirror for imaging an area rearward of a vehicle (including an area obliquely rearward of the vehicle) has been provided on a side of a vehicle front portion. There are various inventions related to such a mirror, and for example, there is an invention to reduce wind noise during driving by forming convex pieces extending rearwardly on a rear end edge of a housing which is an outer shell member of the mirror (see Patent Document 1 below).

Meanwhile, in recent years, there has been studied a system for imaging the area rearward of the vehicle by an imaging device instead of the mirror and for displaying a captured image on an instrument panel or the like. With this system, it is possible to check a rear situation of the vehicle without significantly diverting driver's eyes from a forward area.

Further, as a device used for the above-described system, there is a rear imaging device including an imaging device and a housing for housing the imaging device (see Patent Document 2 below). The rear imaging device is formed with a recessed portion in a rear portion of the housing, and a lens of the imaging device or a lens filter covering the lens is disposed in the recessed portion. Then, the imaging device in the housing captures an image of the area rearward of the vehicle from inside the recessed portion. Hereinafter, a combination of the lens and the lens filter is referred to as a "transparent member".

CITATION LIST

Patent Literature

[Patent Document 1]
Japanese Utility Model Publication No. S61-058141
[Patent Document 2]
Japanese Patent Application Publication No. 2009-241749

SUMMARY OF INVENTION

Technical Problem

When a moving speed of the mobile object such as the vehicle is relatively fast, and a force (hereinafter, sometimes referred to as a "wind force"), which is applied to water droplets adhering to the housing from wind caused by movement of the mobile object, is relatively large, the water droplets are scattered rearwardly from a rear end edge of the housing. On the other hand, when the moving speed of the mobile object such as the vehicle is relatively slow, and the wind force, which is applied to the water droplets adhering to the housing, is relatively small, the water droplets are hardly scattered rearwardly from the rear end edge of the housing. Therefore, in the rear imaging device, the water droplets moving into the recessed portion from the rear end edge of the housing adhere to the transparent member of the imaging device, and the water droplets are reflected in the image.

The present invention has been made in order to solve the above problems, and an object of the present invention is to provide a rear imaging device which is less likely to reflect the water droplets in the image.

Solution to Problem

The present invention to solve the above problems is a rear imaging device attached to a mobile object, including an imaging device for imaging an area rearward of the mobile object, and a housing for housing the imaging device, wherein a rear end portion of the housing is formed with drainer pieces extending rearwardly, a plurality of the drainer pieces are formed in a circumferential direction of the housing, tip end portions of the drainer pieces are formed narrower toward tip end points thereof, and base portions of adjacent drainer pieces are continuous to each other.

According to the present invention, a water droplet adhering to an outer peripheral surface of the housing is moved rearwardly by receiving the wind force during movement, to be moved to one of the plurality of drainer pieces. Then, a plurality of water droplets moving to each of the drainer pieces are merged during they move to the tip end point of each of the drainer pieces or at each of the tip end points, to be a water droplet having a large diameter. Therefore, even when the moving speed of the mobile object is relatively small, the wind force which the water droplet receives is increased, and thus the water droplet is easily scattered rearwardly from the tip end point of the drainer piece.

Further, the tip end portion of the drainer piece is preferably formed with a curved surface.

According to the structure, it is possible to ensure safety when colliding with the tip end portion of the drainer piece.

Further, it is preferred that the drainer piece is a triangle whose vertex is the tip end point thereof, and an interior angle formed by two sides connected to the tip end point is 45° to 75°.

According to the structure, the water droplet adhering to an edge of the drainer piece is easy to move to a tip end side of the drainer piece by the wind force. Therefore, it is possible to collect the water droplets to the vertex along the edge of the drainer piece. Further, according to the structure, a length of the drainer piece in a front-rear direction can be relatively short. Therefore, it is possible to efficiently merge the water droplets while avoiding an increase in size of the housing.

Further, it is preferred that a rear portion of the housing is formed with a recessed portion recessed forwardly from the base portion of the drainer piece, and a transparent member of the imaging device is disposed in the recessed portion.

According to the structure, the water droplets such as rain water and muddy water thrown up by tires, that is, the water droplets flying from a rear of the transparent member, directly hit the outer peripheral surface of the housing, and the water droplets are less likely to adhere to the transparent member.

Advantageous Effects of Invention

In this manner, according to the present invention, even when the transparent member of the imaging device is provided in the recessed portion or on a rear end surface side of the housing, the water droplets are less likely to adhere to the transparent member, and the water droplets are hardly reflected in the image.

DESCRIPTION OF EMBODIMENTS

Hereinafter, embodiments of the present invention will be described in detail with reference to the drawings. Note that, in the embodiments, a case where a "mobile object" is a four-wheel vehicle (hereinafter, simply referred to as a "vehicle V") will be described as an example. In the following description, a forward direction of the vehicle V is "front", and a rearward direction thereof is "rear". Further, "left and right" is based on a driver of the vehicle V.

Figure 1:
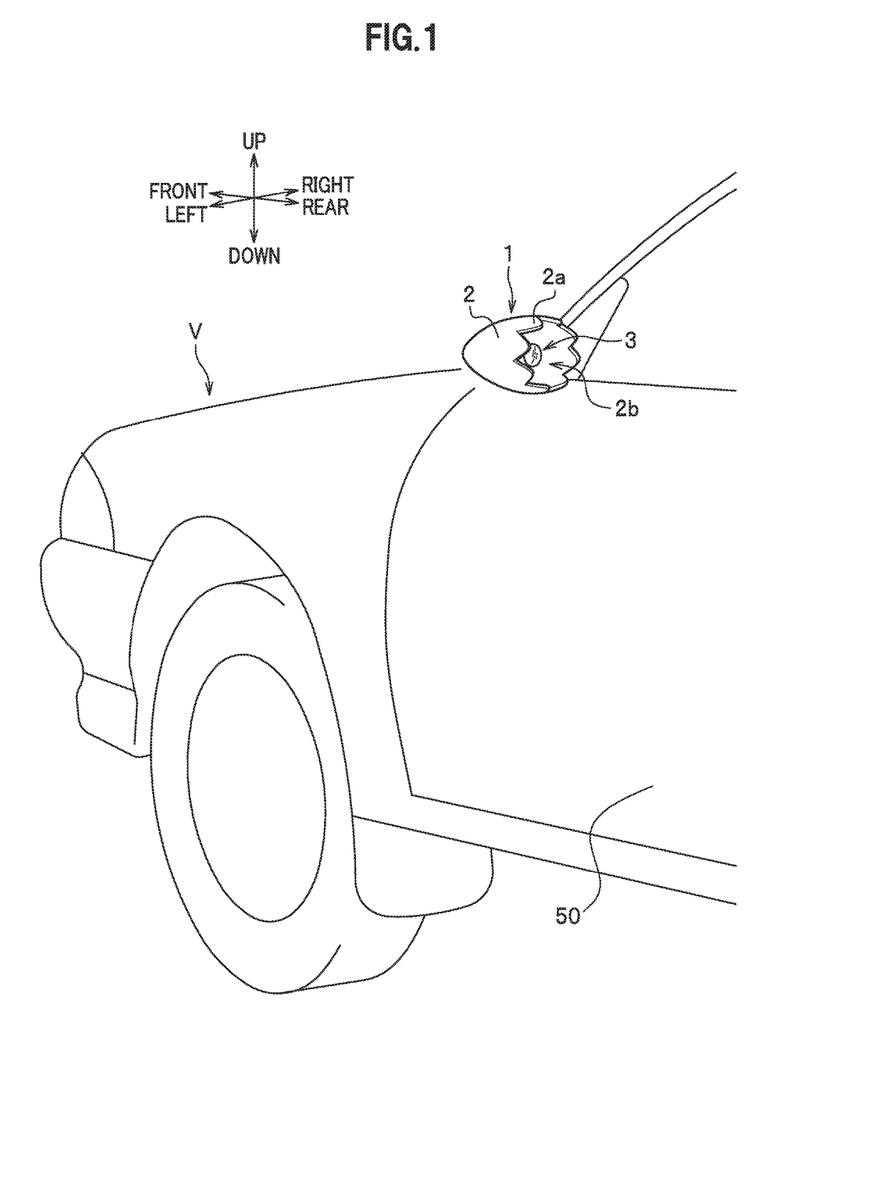
FIG. 1 is a perspective view showing a vehicle equipped with a rear image device according to an embodiment of the present invention.
Figure 2:
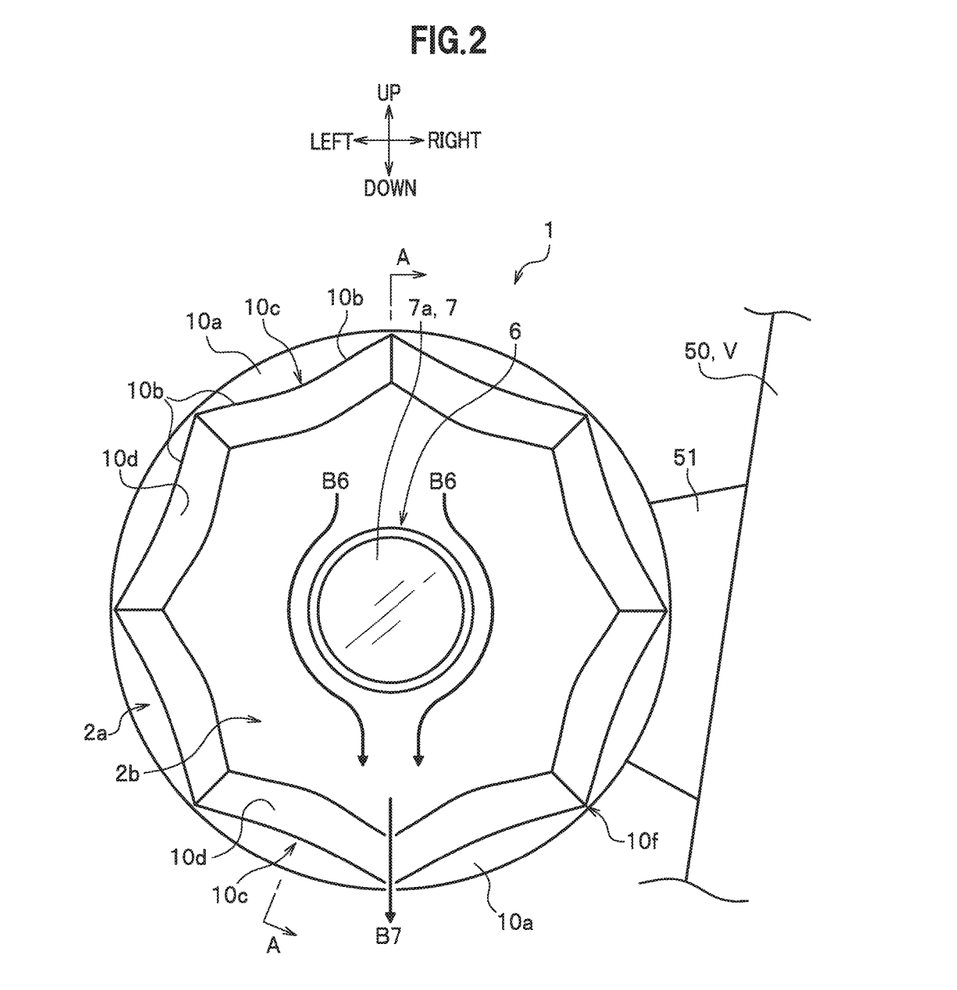
FIG. 2 is a rear view of the rear image device according to the embodiment.

As shown in FIGS. 1 and 2, a rear imaging device 1 is disposed on a left side of a left door 50 of the vehicle V, and is fixed to a stay 51 (see FIG. 2) extending leftwardly from the left door 50. The rear imaging device 1 of the present embodiment includes a housing 2 constituting an outer shell thereof and an imaging device 3 for imaging the rear. A plurality of drainer pieces 2a, 2a, - - - are formed at a rear end portion of the housing 2, and a recessed portion 2b are formed at a rear portion of the housing 2. The imaging device 3 is housed in the housing 2, and captures an image of the rear through an opening of the recessed portion 2b. That is, the rear imaging device 1 captures the image of the rear on the left side of the vehicle V from the left side of the left door 50.

Figure 3:
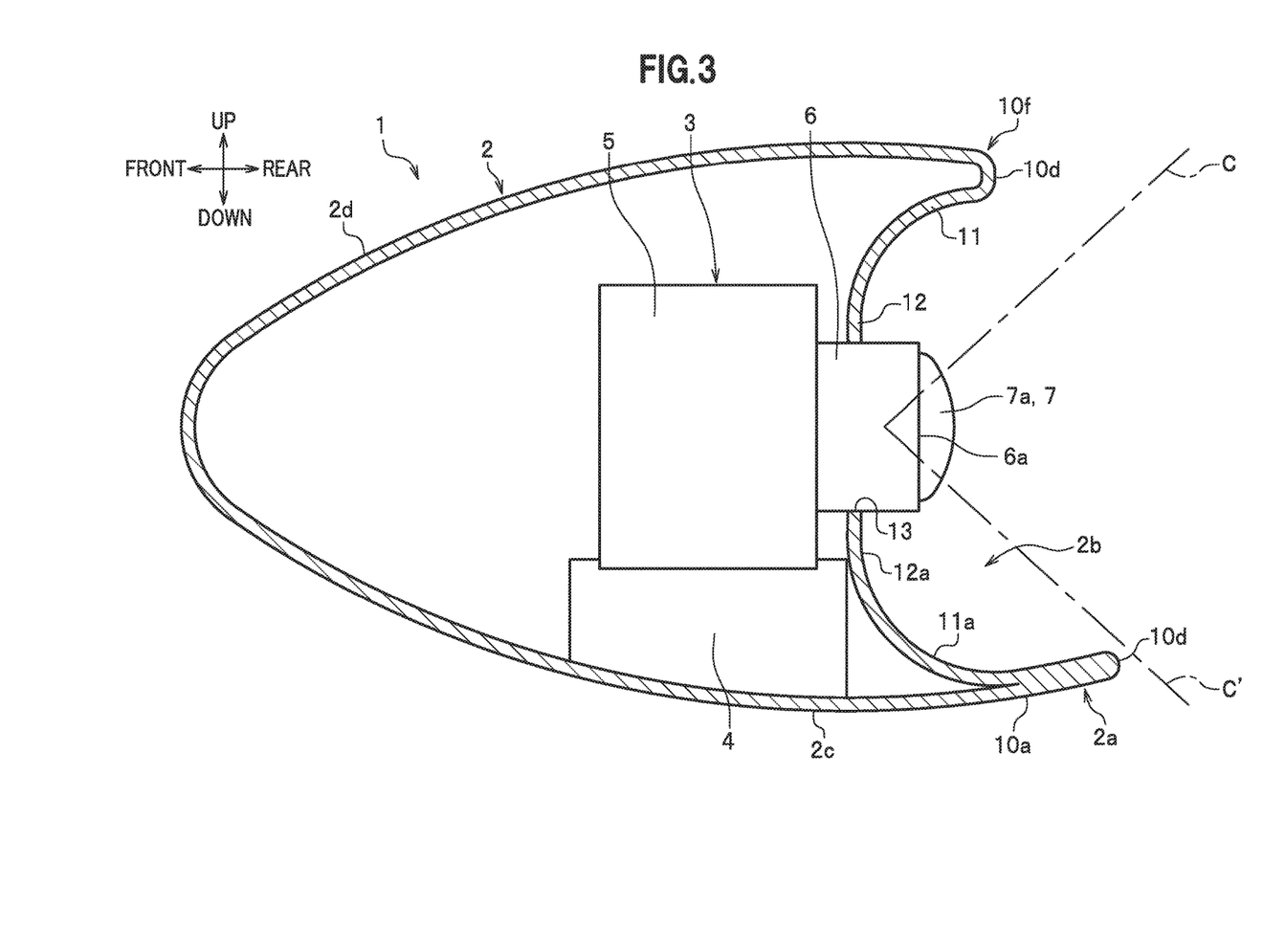
FIG. 3 is an end view taken along a line A-A in FIG. 2.

As shown in FIG. 3, the housing 2 is a casing made of a hard resin, and includes a main body 2d including a space for housing the imaging device 3, and the plurality of drainer pieces 2a, 2a, - - - projecting rearwardly from the main body 2d. The recessed portion 2b which is recessed forwardly is formed at a rear portion of the main body 2d of the housing 2.

An outer peripheral surface 2c of the main body 2d of the housing 2 has a shape (so-called streamlined shape) such that a resistance to an airflow generated during forward movement of the vehicle V (an airflow flowing from the front to the rear) is reduced, and a turbulent flow is less likely to occur in the vicinity of the outer peripheral surface 2c. The outer peripheral surface 2c of a front portion and longitudinal central portion of the housing 2 has a shape of a rotational paraboloid, and is tapered toward the front. Further, the rear portion of the housing 2 (including the main body 2d and a portion formed with the drainer pieces 2a, 2a, - - - ) is tapered toward the rear. Note that, the housing 2 is constructed by combining an upper housing member which opens downwardly and a lower housing member which opens upwardly, from up and down directions. Furthermore, the housing 2 is formed with a mounting seat 4 of the imaging device 3.

The drainer pieces 2a are formed by extending a wall portion constituting the main body 2d of the housing 2 to the rear. An outer surface 10a of the drainer piece 2a is smoothly continuous to the outer peripheral surface 2c of the main body 2d. Further, the outer surface 10a of the drainer piece 2a is curved so as to approach an optical axis of the imaging device 3 toward the rear.

Figure 4:
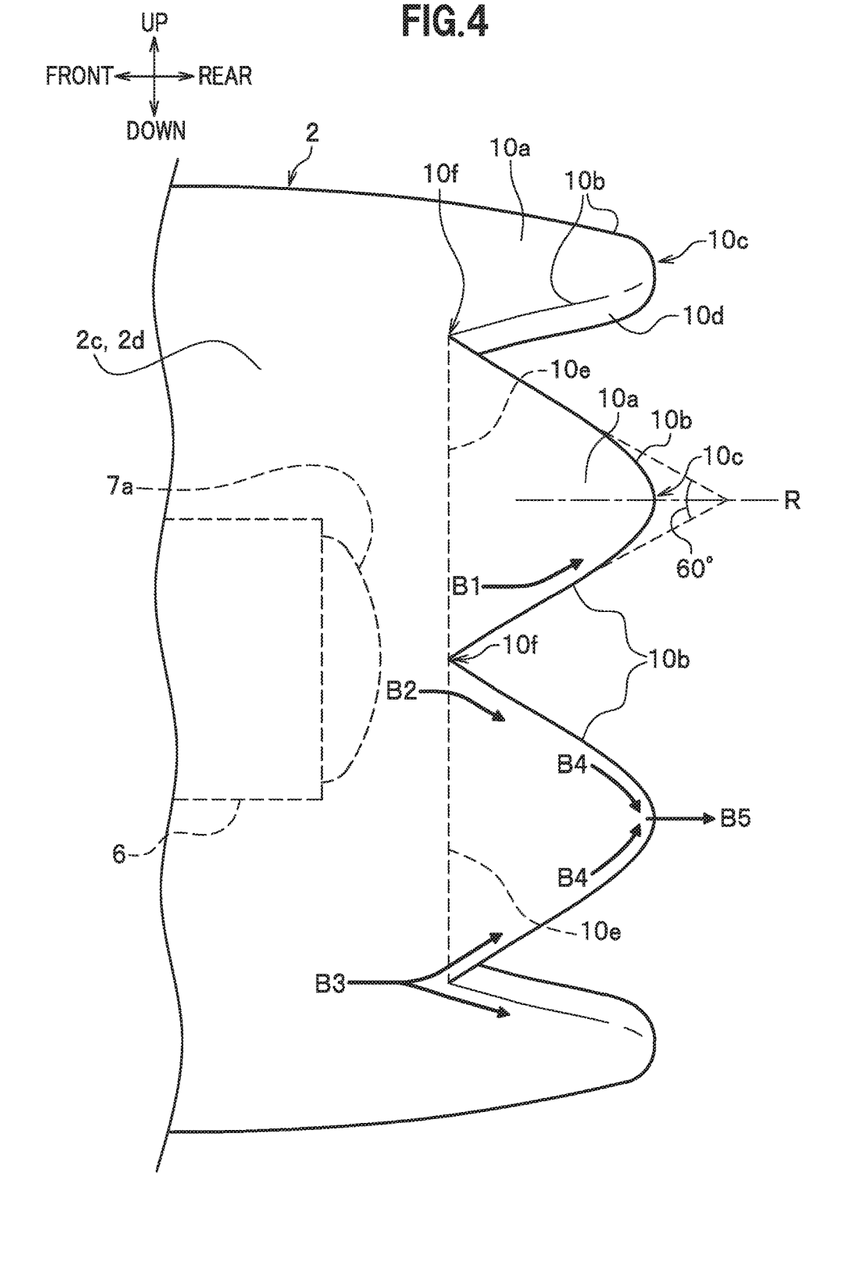
FIG. 4 is an enlarged view of a rear portion of a housing.

Note that, in housing 2, a "boundary line 10e" in FIG. 4 is a line indicating a boundary between the main body 2d and each drainer piece 2a, and corresponds to a base on a base portion side of the drainer piece 2a. As shown in FIG. 4, a shape of the drainer piece 2a (a shape formed by two edges 10b, 10b and the boundary line (base) 10e) is a substantially equilateral triangle, and an intersection angle (interior angle) of the two edges 10b, 10b is 60°. Therefore, the edges 10b of the drainer piece 2a are inclined at about 30° to a streamline R (direction pushed by the airflow) in the rear end portion of the housing 2. In view of ensuring safety at the time of collision, an apex 10c (a tip end point) of the drainer piece 2a is formed with an R surface (a chamfer). That is, an edge 10b at a tip end portion of the drainer piece 2a is formed with a curved surface. The curved surface is preferably formed with a radius of 5 mm or less, and is more preferably formed with a radius of 2.5 mm or less. In the present embodiment, the curved surface is formed with a radius of 2.5 mm.

A thickness of the drainer piece 2a of the present embodiment is 5 mm. Further, in the drainer pieces 2a, 2a adjacent to each other in a circumferential direction, each boundary line (base) 10e, 10e are continuous to each other, and the base portions of the drainer pieces 2a, 2a are adjacent to each other. Therefore, as shown in FIG. 4, the edges 10b, 10b of the plurality of drainer pieces 2a, 2a are continuous in a zigzag shape (wave shape), to form a rear end edge of the housing 2. Hereinafter, an intersection point of the edges 10b, 10b of the adjacent drainer pieces 2a, 2a (a boundary of the drainer pieces 2a, 2a) is referred to as a branch point 10f.

As shown in FIG. 3, a peripheral wall portion 11 of the recessed portion 2b has a spherical annular shape, and extends forwardly from an inner peripheral edge of the base portion of the drainer piece 2a. A cross-sectional shape obtained by cutting the peripheral wall portion 11 in a plane normal to the optical axis of the imaging device 3 is circular. The peripheral wall portion 11 is reduced in diameter toward the front. A bottom portion 12 of the recessed portion 2b has a hollow disk shape perpendicular to a front-rear direction, and is smoothly continuous to a front end of the peripheral wall portion 11. A hollow portion provided in a central portion of the bottom portion 12 is a through-hole 13 penetrating in the front-rear direction. A cylindrical body 6 of the imaging device 3 is inserted into the through-hole 13. The through-hole 13 is formed in the same shape as an outer peripheral surface of the cylindrical body 6, so that water droplets do not enter the housing 2 from a gap between the cylindrical body 6 and a hole wall of the through-hole 13.

Note that, the peripheral wall portion 11, the bottom portion 12 and the drainer pieces 2a are radially outward from a field angle of a lens 7a (that is, a maximum imaging range of the imaging device 3). That is, the lens 7a is located at a position not to reflect the drainer pieces 2a, the peripheral wall portion 11 and the bottom portion 12.

The imaging device 3 includes a main body 5 fixed to the mounting seat 4 in the housing 2, the cylindrical body 6 extending rearwardly from the main body 5, and a plurality of lenses 7 housed in the cylindrical body 6 (in FIGS. 3, 4, only a rearmost lens 7a is shown among the plurality of lenses 7). Note that, in the present embodiment, the main body 5 is fixed to the mounting seat 4, but a method of fixing the imaging device 3 is not limited thereto. For example, it may be configured such that a pair of ribs extending inwardly of the housing in a vertical direction is provided so that the main body 5 is sandwiched by the pair of ribs.

The main body 5 is for converting the image of the rear of the vehicle to an electrical signal, and includes an image sensor (not shown) capable of converting light from the lens 7 to the electrical signal. The main body 5 transmits information obtained (the electrical signal) to a monitor or the like in the vehicle V. As a result, the image obtained by the imaging device 3 is displayed on the monitor, so that the driver can check a left rear situation by watching the monitor.

The cylindrical body 6 is a cylindrical member, and passes through the bottom portion 12 of the housing 2. Further, the cylindrical body 6 has an outer diameter formed in the same diameter over a longitudinal direction thereof. The lens 7a is held at a rear end 6a of the cylinder body 6. A spherical surface of the lens 7a protrudes from the rear end 6a of the cylinder body 6, and is exposed to the outside of the cylindrical body 6. That is, the lens 7a is located rearwardly from the bottom portion 12 of the housing 2, and faces the rear of the vehicle from the opening of the recessed portion 2b. Note that, the lens 7a is located on the bottom portion 12 side than the boundary line (base) 10e of the drainer piece 2a. That is, the lens 7a is surrounded by the peripheral wall portion 11 of the recessed portion 2b (see FIG. 4). Note that, it is configured such that the lens 7a according to the present embodiment corresponds to a "transparent member" described in claims. Incidentally, the field angle (an angle of a broken line C-C' in FIG. 3) of the imaging device 3 is 90°.

Functions of the drainer piece 2a will be described. The edge 10b of the drainer piece 2a is inclined at about 30° to the streamline R (direction pushed by the airflow) in the rear end portion of the housing 2, and most of the water droplets, which are pushed by the airflow and reach the edge 10b of the drainer piece 2a, move along the edge 10b of the drainer piece 2a (see an arrow B1 in FIG. 4).

Note that, when the intersection angle (interior angle) of the two edges 10b, 10b is increased, force component of the wind force in a direction along the edge 10b is reduced. Therefore, the water droplets are less likely to move along the edge 10b of the drainer piece 2a. For this reason, the intersection angle of the two edges 10b, 10b is preferably small. On the other hand, when the intersection angle of the two edges 10b, 10b is too much reduced without changing a length of the boundary line (base) 10e, the apex 10c of the drainer piece 2a extends rearwardly, and a length in the front-rear direction of the drainer piece 2a is increased. Therefore, there is a possibility that the drainer piece 2a is reflected in the imaging device 3, and the field angle of the imaging device 3 is substantially reduced. Therefore, in the present embodiment, the drainer piece 2a has a substantially equilateral triangular shape (the intersection angle of the edges 10b, 10b is 60°). In this way, it is intended to move a lot of water droplets along the edge 10b and to ensure the field angle of the imaging device 3. Note that, a range of the intersection angle of the two edges 10b, 10b in order to achieve the above-described two effects, is 45° to 75°, preferably 55° to 65°, and more preferably 60° which is described in the embodiment. Further, the two edges 10b, 10b continuous to the apex 10c is preferably formed in line symmetry with a symmetrical axis parallel to the front-rear direction.

Further, in the branch point 10f, in order to move the water droplets along the edge 10b of the drainer piece 2a from the branch point 10f, the intersection angle of the edges 10b, 10b of the drainer pieces 2a, 2a adjacent to each other is preferably smaller. Note that, the above-described case of moving the water droplets along the edge 10b of the drainer piece 2a from the branch point 10f, includes a case of moving the water droplets along one edge 10b of the drainer pieces 2a adjacent to each other, and a case of dividing and moving the water droplets to the two edges 10b at a boundary of the branch point 10f. On the other hand, when the intersection angle of the edges 10b, 10b of the drainer pieces 2a, 2a adjacent to each other is too much reduced, an interval between end surfaces 10d, 10d of the drainer pieces 2a, 2a adjacent to each other is relative small, and the water droplets are easy to adhere (remain) between the end surfaces 10d, 10d of the drainer pieces 2a, 2a. Then, as described above, the drainer piece 2a of the present embodiment has a substantially equilateral triangle shape, and the intersection angle of the edges 10b, 10b of the drainer pieces 2a, 2a adjacent to each other is 60°. In this way, it is intended to move the water droplets along the edges 10b of the drainer pieces 2a without allowing the water droplets to remain at the branch point 10f, and to ensure that the water droplets are less likely to adhere (remain) between the drainer pieces 2a, 2a. The range of the intersection angle of the two edges 10b, 10b in order to achieve the above-described two effects, is 45° to 75°, preferably 55° to 65°, and more preferably 60° which is described in the embodiment.

Further, when wall thickness of the drainer piece 2a is reduced, the water droplets are likely to scatter to the rear even when the water droplets adhere to the end surface 10d. Furthermore, the water droplets are less likely to remain between the edge surfaces 10d, 10d adjacent to each other, and are likely to scatter to the rear. Therefore, the water droplet adhering between the end surfaces 10d of the drainer pieces 2a is hardly involved in turbulence, and the water droplet is less likely to flow into the recessed portion 2b. For the above reasons, the wall thickness of the drainer piece 2a (a width of the end surface 10d of the drainer piece 2a) is preferably thinner. However, when the wall thickness of the drainer piece 2a is too much reduced, there is a possibility that wind noise during driving is generated. In the present embodiment, the wall thickness of the drainer piece 2a is 5 mm, and when it is the thickness of this level, it is possible to suppress generation of the wind noise and to suppress the water droplet from remaining at the drainer piece 2a. Further, it is possible to ensure strength of the drainer piece 2a and to ensure safety without sharpening the drainer piece 2a. Note that, the wall thickness of the drainer piece 2a formed from other than the hard resin will be described in modifications described below.

Next, a relationship between the imaging device 3 and an inner surface of the recessed portion 2b will be described in more detail. Note that in the following description, a surface facing the recessed portion 2b (surface exposed to the outside of the housing 2) out of front and rear surfaces of the peripheral wall portion 11 is referred to as an "inner peripheral surface 11a", and a surface facing the recessed portion 2b out of front and rear surfaces of the bottom portion 12 is referred to as a "bottom surface 12a". As shown in FIG. 3, the cylindrical body 6 of the imaging device 3 protrudes rearwardly from the bottom surface 12a of the recessed portion 2b. Therefore, the lens 7a held by the cylindrical body 6 is spaced from the bottom surface 12a and is not continuous to the bottom surface 12a.

Next, an example of a movement path of the water droplet while the vehicle is moving will be described. When the vehicle V moves in rainy weather or the like, the water droplets fly from the front of the rear imaging device 1 and adhere to the outer peripheral surface 2c of the main body 2d of the housing 2. The water droplets adhering to the outer peripheral surface 2c of the main body 2d are pushed by the airflow and move rearwardly to the plurality of drainer pieces 2a, and reach the edge 10b or the apex 10c of one drainer piece 2a, or reach the edge 10b in a vicinity of the branch point 10f of the drainer pieces 2a, 2a.

The water droplets reaching the edge 10b of the drainer piece 2a move along the edge 10b (see the arrow B1 in FIG. 4). The droplets reaching the vicinity of the boundary (vicinity of the branch point 10f) of the drainer pieces 2a, 2a adjacent to each other, move along one edge 10b of the drainer pieces 2a adjacent to each other (see an arrow B2 in FIG. 4), or are divided at the boundary of the branch point 10f and move to the two edges 10b (see an arrow B3 in FIG. 4). In this way, one water droplet adhering to the outer peripheral surface of the housing 2 moves along one of the edges 10b of the drainer pieces 2a.

Then, the plurality of water droplets moving along one drainer piece 2a are merged at the apex 10c of the drainer piece 2a (see an arrow B4 in FIG. 4), and are likely to be a large water droplet. When the water droplet is large, the wind force which the water droplet receives from the airflow is increased, and thus the water droplet is scattered rearwardly from the apex 10c of the drainer piece 2a (see an arrow B5 in FIG. 4).

Further, only a small part of the water droplets, which move around the end surface 10d of the drainer piece 2a and adhere to the inner peripheral surface ha of the recessed portion 2b, sometimes moves to the bottom surface 12a by influence of turbulence (vortex), however, since the cylindrical body 6 protrudes from the bottom surface 12a, the water droplets moving to the bottom surface 12a mainly adhere to the outer peripheral surface of the cylinder body 6.

Note that, when the vehicle is stopped or moving slowly with small influence of turbulence, the water droplets moving to the bottom surface 12a of the recessed portion 2b and the water droplets adhering to the outer peripheral surface of the cylinder body 6, gravitationally move downwardly of the cylinder body 6 (see arrows B6 in FIG. 2), and then move to an opening of the recessed portion 2b along the inner peripheral surface ha on a lower side of the recessed portion 2b, to be drained from the opening (see an arrow B7 in FIG. 2). Further, as shown in FIG. 2, the branch point 10f is formed at a lowermost portion of the recessed portion 2b of the housing 2. Therefore, the water droplets gravitationally moving along the inner peripheral surface 11a of the recessed portion 2b are easy to flow out to the outside of the housing 2 through between the drainer pieces 2a, 2a adjacent to each other.

As described above, with the rear imaging device 1 according to the embodiment, since the water droplets flowing into the recessed portion 2b from the outer peripheral surface 2c of the housing 2 are reduced, the water droplets are less likely to adhere to the lens 7a, and thus the water droplets are hardly reflected in the image captured by the imaging device 3.

Further, the lens 7a of the imaging device 3 is located forward of the boundary line (base) 10e of the drainer piece 2a. That is, the lens 7a is located at the back of the recessed portion 2b. In this way, rain water, muddy water thrown by tires, and the like are less likely to directly hit the lens 7a.

Note that, in the present embodiment, the four-wheel vehicle V is described as the mobile object mounted with the rear imaging device 1, however, it is not intended to limit the scope of the present invention. For example, it is possible to apply the present invention to the vehicle of four or more wheels, and to apply the present invention also to mobile objects such as aircraft and ships in addition to vehicles such as bar-handle vehicles and railroad vehicles.

Further, the imaging device 3 of the present embodiment is not provided with anything behind the lens 7a, but an imaging device including a lens filter behind the lens 7a may be used.

Further, the drainer piece 2a according to the present embodiment is formed integrally with the main body 2d of the housing 2, and is formed of the same material as the housing 2, however, the present invention is not limited thereto, and the drainer piece 2a may be a separate body from the main body 2d of the housing 2. When the drainer piece 2a is the separate body from the main body 2d of the housing 2, the drainer piece 2a may be formed of a soft material (for example, rubber) having a hardness lower than that of the material of the housing 2. Further, when the drainer piece 2a has a wall thickness of at least 3 mm, it is possible to suppress the wind noise. When the wall thickness of the drainer piece 2a is smaller than the thickness (=5 mm) of the drainer piece 2a of the embodiment described above, it is possible to more effectively suppress the water droplets from remaining at the drainer piece 2a. Note that, when the wall thickness of the drainer piece 2a is less than 5 mm, it is preferable to form the drainer piece 2a with a soft material in consideration of safety. Further, the wall thickness of the drainer piece 2a is preferably less than 10 mm. Because, when the wall thickness is 10 mm or more, the water droplets reaching the apex 10c are less likely to scatter to the rear, and the water droplets are likely to flow into the recessed portion 2b.

Figure 5A:
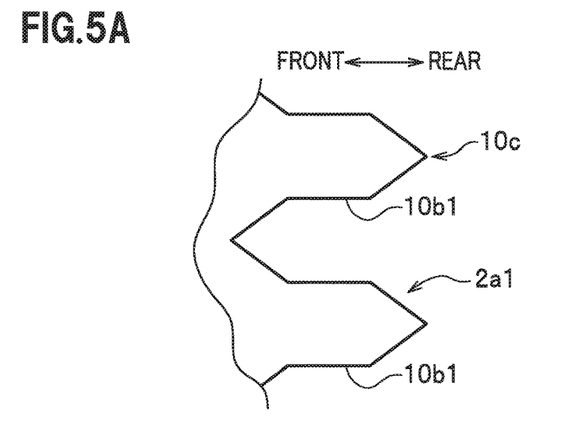
FIGS. 5A to 5C are views showing drainer pieces according to modifications of the present invention.
Figure 5B:
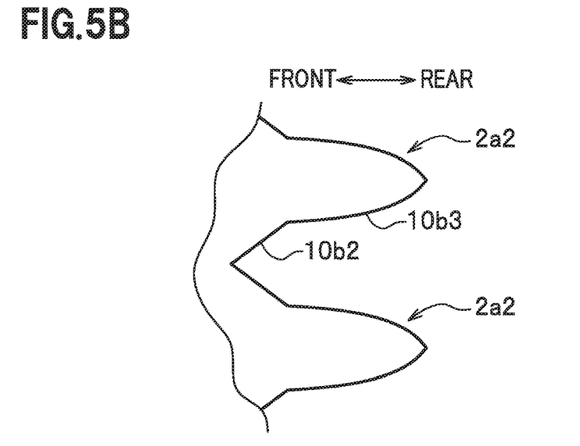
Figure 5C:
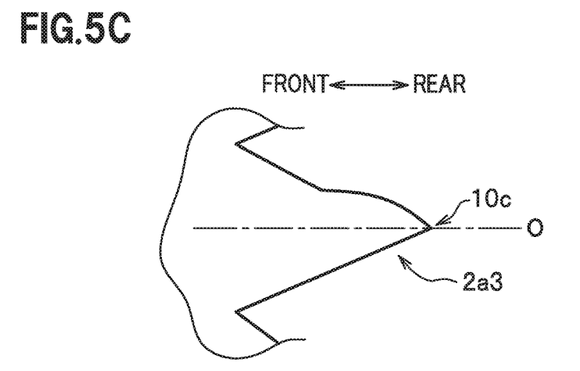

Further, in the present embodiment, a case in which the drainer piece 2a has a triangular shape is described as an example, however, the edges 10b may be bent in the middle, if there is a portion of a substantially triangle shape (portion which is narrower toward the apex 10c) at least at the tip end portion of the drainer piece 2a. That is, the shape of the drainer piece 2a is not limited to a triangular shape. For example, as shown in FIG. 5A, a rectangular portion may be provided in an intermediate portion in the front-rear direction of the drainer piece 2a. That is, the drainer piece 2a may include parallel edges 10b1 in a streamline direction. Further, as shown in FIG. 5B, the edges of the drainer piece 2a may be formed by combining a linear edge 10b2 and a curved edge 10b3. Further, an inclination angle of the edge 10b in the front-rear direction (inclination angle of a tangent line to the curve, when the edge 10b includes a curved portion) is preferably 37.5° or less over the entire edge 10b excluding the tip end portion of the drainer piece 2a, and is more preferably 32.5° or less. Since the entire edge 10b is formed with this inclination angle, the water droplets are likely to move by the wind force. Further as shown in FIG. 5C, the drainer piece 2a may be an asymmetric drainer piece 2a3 with a boundary of an axis line O passing through the apex 10c. Furthermore, the drainer piece 2a may have a shape with a plurality of tip end points by dividing the tip end portion thereof into two or more.

Further, a length in the front-rear direction of the drainer piece 2a (distance between the apex 10c and the boundary line 10e in the vehicle longitudinal direction) is preferably at least 5 mm, and is more preferably at least 10 mm. When the length in the front-rear direction of the drainer piece 2a is at least 5 mm, the water droplets are less likely to flow to the end surface 10d or the edge 10b located on the lower side of the apex 10c, and the water droplets merging together at the apex 10c easily become large. In particular, when the length of the drainer piece 2a is at least 10 mm, the water droplets are likely to move to the apex 10c, and the water droplets merging together easily become large. Therefore, the wind force which the water droplet receives from the airflow is increased, and thus the water droplet is reliably scattered rearwardly from the apex 10c of the drainer piece 2a.

REFERENCE SIGNS LIST

1: rear imaging device
2: housing
2a, 2a1, 2a2, 2a3: drainer piece
2b: recessed portion
2c: outer peripheral surface
2d: main body
3: imaging device
7, 7a: lens (transparent member)
10a: outer surface
10b, 10b1, 10b2, 10b3: edge (side)
10c: apex
10d: end surface
10e: boundary line (base)
10f: branch point
11: peripheral wall portion
11a: inner peripheral surface
12: bottom portion
12a: bottom surface
13: through-hole

The invention claimed is:

1. A rear imaging device attached to a mobile object, comprising
an imager for imaging an area rearward of the mobile object, and
a housing for housing the imager,
wherein a rear end portion of the housing is formed with drainer pieces extending rearwardly,
wherein a plurality of the drainer pieces are formed in a circumferential direction of the housing,
wherein tip end portions of the drainer pieces are formed narrower toward tip end points thereof, and
wherein base portions of adjacent drainer pieces are adjacent to each other.

2. The rear imaging device according to claim 1, wherein the tip end portion of the drainer piece is formed with a curved surface.

3. A rear imaging device attached to a mobile object, comprising:
an imager for imaging an area rearward of the mobile object, and
a housing for housing the imager,
wherein a rear end portion of the housing is formed with drainer pieces extending rearwardly,
wherein a plurality of the drainer pieces are formed in a circumferential direction of the housing,
wherein tip end portions of the drainer pieces are formed narrower toward tip end points thereof,
wherein base portions of adjacent drainer pieces are adjacent to each other, and
wherein the drainer piece is a triangle whose vertex is the tip end point thereof, and an interior angle formed by two sides connected to the tip end point is 45° to 75°.

4. The rear imaging device according to claim 1,
wherein a rear portion of the housing is formed with a recessed portion recessed forwardly from the base portion of the drainer piece, and
wherein a transparent member of the imaging device is disposed in the recessed portion.

5. The rear imaging device according to claim 3,
wherein a rear portion of the housing is formed with a recessed portion recessed forwardly from the base portion of the drainer piece, and
wherein a transparent member of the imaging device is disposed in the recessed portion.

6. The rear imaging device according to claim 2, wherein the drainer piece is a triangle whose vertex is the tip end point thereof, and an interior angle formed by two sides connected to the tip end point is 45° to 75°.

7. The rear imaging device according to claim 2,
wherein a rear portion of the housing is formed with a recessed portion recessed forwardly from the base portion of the drainer piece, and
wherein a transparent member of the imaging device is disposed in the recessed portion.

8. The rear imaging device according to claim 1, wherein the imager has an optical axis directed rearwardly, and wherein the drainer pieces extend rearwardly beyond the imager relative to a direction of the optical axis.

* * * * *